3,696,042
PROCESS FOR SIMULTANEOUSLY CLEANING
WINDSHIELDS AND CONDITIONING WIPER
BLADES
Sheldon A. Wright, Morton Grove, Ill.,
assignor to STP Corporation
No Drawing. Filed Sept. 24, 1970, Ser. No. 75,274
Int. Cl. C11d 1/66
U.S. Cl. 252—153    6 Claims

ABSTRACT OF THE DISCLOSURE

A process and composition useful for simultaneously cleaning vehicle windshields and conditioning rubber windshield wiper blades. The composition includes a major proportion of a lower alcohol cleaning agent, such as methyl alcohol, and a minor proportion of diethylene glycol, which not only acts as a freezing point depressant, but also acts to treat the rubber wiper blades so as to renew old blades and lengthen the life expectancy of new wiper blades.

BACKGROUND OF THE INVENTION

Field of the invention and
Description of the prior art

This invention relates to a method and composition for conditioning rubber wiper blades so as to restore the blades and lengthen their life.

In the formulation of compositions used in connection with automobile window washing systems, many objectives are sought to be met. A basic consideration in making these formulations is that they are to have a highly effective cleaning ability for removing road film, grease, dirt, bug stains, and the like from the glass windshield. Additionally, these compositions are intended to be used both in the warm summer months and in the cold winter months so these liquid compositions are to retard and resist freezing of the cleaning solution. In addition to these two important considerations, it is highly desirable that the solution be non-flammable, relatively harmless to automobile finishes, and have the ability to keep the washer jets and orifices in the washer system clean and useful. These solutions should also be completely stable over a wide temperature range, and desirably should have a freezing point of less than —30° F. at a dilution level of about 1/1. These cleaning solutions are also to resist icing as the solution contacts cold windshields, and they also should prevent streaking.

Generally speaking, commercially available windshield washer solutions comprise a lower alcohol cleaning agent and a surface active agent in an amount less than 1% by weight. Methyl alcohol is commonly used in high proportions, and as high as 99% by weight of the total solution. Other types of commercially available windshield washer solutions contain high proportions of methyl alcohol and isopropyl alcohol. At least one cleaner solution is known to contain between 5 and 10% of ethylene glycol. Another known washer solution contains approximately 50% water, methyl Cellosolve, about 10% of methyl carbitol, and a small percentage of a surface active agent. The surface active agent used in these commercially available compositions include cationic surfactants and non-ionic surfactants; oil in water emulsifiers are also being used. Surfactants which are used include ethoxylated nonylphenol, polysorbitan fatty ester, ethoxylated sorbitan fatty ester, and quaternary ammonia compounds. The freezing points of these commercially available washer solutions at a 1:1 dilution with water are about —14° F. to —36° F.

Although these known windshield washer cleaning solutions have generally met with commercial acceptance, none of these known products have attempted to treat the problem of the so-called "dead" wiper blades, commonly found with automobiles. Thus, very fine washer solutions, meeting all of the standards for such products outlined above, can be used, but when the automobile has "dead" wiper blades, streaking and inadequate cleaning of the windshield results. As any driver knows, streaking of the windshield caused by old wiper blades creates an unsafe condition, particularly when driving on high speed, heavy traffic expressways, and when driving at night. It would be clearly very desirable to provide a suitable composition for cleaning windshields while at the same time renewing the life of the rubber in a "dead" streaking windshield wiper blade, so as to at least alleviate the problems and unsafe conditions caused by these blades. Thus, while it is recognized that replacement of a streaking window wiper blade is the only long term answer to the problem, nevertheless, at least temporary or short term revival of the rubber wiper blades would provide very beneficial results.

SUMMARY OF THE INVENTION

It is, therefore, an important object of this invention to provide a unique liquid windshield washer solution useful in a windshield washer system of automobiles, wherein substantially all of the accepted standards for windshield washer solutions are met while at the same time the same composition conditions the rubber windshield wiper blades so as to renew their life and/or lengthen their life.

It is also an object of this invention to provide an improved windshield washing method and composition wherein the composition is particularly characterized by its ability to effectively clean windshields while simultaneously restoring the life of the rubber wiper blades.

It is a further object of this invention to provide a unique windshield washer composition which includes a suitable rubber plasticizing agent which improves the flexibility and resiliency of the windshield wiper blade, thereby restoring or lengthening its life, while also acting as a freezing point depressant for the washer solution.

It is still another object of this invention to provide an improved process and composition for washing windshields wherein the composition not only retards freezing but effectively cleans the windshield, has relatively little effect on the automobile finish, retards freezing, and acts to restore rubber wiper blades so as to reduce or eliminate streaking caused by old wiper blades.

Further purposes and objects of this invention will appear as the specification proceeds.

All of the foregoing objects are accomplished by providing a composition and process for simultaneously cleaning windshields and for conditioning rubber windshield wiper blades wherein the composition comprises a major proportion of a lower monohydric alcohol cleaning agent and a minor proportion of diethylene glycol, which acts as the wiper blade conditioner, the composition being applied to the windshield while the wiper blade is acting against the windshield so that the blade is being restored as the windshield is being cleaned.

DETAILED DESCRIPTION OF THE PREFERRED EMBODIMENT

In its broadest aspect, my invention comprises a liquid windshield washer composition which restores rubber wiper blades, wherein the composition includes a major proportion of a low alcohol cleaning agent and a minor proportion of diethylene glycol.

The lower alcohol useful in the cleaning composition includes methyl alcohol, ethyl alcohol and isopropyl alcohol. Methyl alcohol is preferably used because it not only provides a high quality cleaning ability, but it also has a retarding effect on the freezing point of the washer solution when diluted with water. Desirably, at least about 90% by weight of the solution comprises the lower alcohol. Preferably, methyl alcohol is used in a proportion of about 92-94% by weight.

The critical constituent of my formulation is diethylene glycol which has been found to give the desirable life prolonging effect on rubber wiper blades by causing improved flexibility and resiliency thereof. Although diethylene glycol is known to have been used as a plasticizer for rubber, its use as a constituent in a windshield washer cleaning composition has not been previously known and its restoring effect upon the life of the rubber windshield wiper blades is unknown. Diethylene glycol is also useful in my liquid composition because it acts as a freezing point depressant. It has been found that only minor proportions of the diethylene glycol need be used, desirably about 3-5% by weight of the composition. Preferably about 4% by weight of the composition comprises diethylene glycol. Not only has the composition been found to renew used rubber wiper blades, but it also increases the life expectancy of new wiper blades.

In addition to the use of lower alcohols and diethylene glycol in my washer solution, other components are advantageously included in the windshield washing composition. Desirably, ammonia in a water solution is used for enhancing the cleaning effectiveness of the composition. Ammonia, in a 28% water solution, added to the composition in an amount within the range of 0.5-3% by weight of the liquid composition has been found to be effective, with a composition in an amount of about 3% being presently preferred. I also prefer to include in my composition a surface active agent, in a proportion of less than 1% by weight. Because my composition is to be used as an effective summertime windshield washer cleaning solution at high dilutions, and it is known that non-ionic surfactants lose their effectiveness or activity less quickly than other types of surfactants upon dilution with water, a non-ionic surfactant is preferably used. A surfactant which has been found particularly effective is a non-ionic surfactant of the ethoxylated nonylphenol type. Such a surfactant is commercially available under the trademark Triton X-100 or Igepal CO-630. Preferably, surfactant is used in an amount of about 0.5% by weight.

Other components of our solution may include a dye in trace amounts and a corrosion inhibitor if the liquid product is to be packaged in a metal container. Sodium benzoate in proportions less than 1%, as about 0.25% by weight, is particularly effective in retarding corrosion of metal cans.

The following sets forth specific examples of my invention:

EXAMPLE I

The following windshield washing formulation was made:

| | Parts |
| --- | --- |
| Methyl alcohol | 92.5 |
| Diethylene glycol | 4.0 |
| Ammonia (28% solution) | 3.0 |
| Ethoxylated nonylphenol (Triton X-100 or Igepal CO-630) | 0.5 |
| Phenamine Brilliant Blue 6B (dye) | 0.00375 |
| Sodium benzoate (if packaged in metal) | 0.25 |

At a 1:1 dilution ratio with water, the freezing point was minus 30° F. The proposed formula was found to be equal to competitive products at removing both soil and grease at low temperatures, retarding re-icing, and preventing streaking. It had no apparent effect on paint finishes when diluted. The diethylene glycol plasticizer has been demonstrated to be capable of renewing the windshield wiper blades.

EXAMPLE II

Two windshield wiper formulations were prepared for comparison purposes. Formula B contained all ingredients desired, while Formula A excluded diethylene glycol.

| Formula | A, parts | B, parts |
| --- | --- | --- |
| Ingredients: | | |
| Methyl alcohol | 92.5 | 92.5 |
| Diethylene glycol | | 4.0 |
| Ammonia (28% solution) | 3.0 | 3.0 |
| Ethoxylated nonylphenol | 0.5 | 0.5 |
| Blue dye | Trace | Trace |
| Sodium benzoate | 0.25 | 0.25 |

Products A and B were put into separate bottles and were applied twice daily for two weeks to divided halves of a 1961 Volkswagen windshield. The cleaning was noted to be excellent for both formulas and the wiper blades were operated until the material was dry. The blades were inspected after each use. The rubber blades used were original equipment Volkswagen windshield wiper blades and were over four years old.

Inspection revealed that the blades wiped with Formula A remained hard and still streaked during operation. Formula B showed the second blade to be more resilient by the fourth usage. The blade treated with Formula B wiped cleaner than it had done prior to treatment with the formula which included diethylene glycol. After one week and fourteen trials, it was concluded that the formulation including diethylene glycol had provided a wiper blade which had become more resilient, pliable, and soft. This rubber wiper blade wiped cleaner than the same age wiper blade, treated with Formula A, which did not include diethylene glycol.

It is found that all the ingredients in Formula B evaporated more quickly than diethylene glycol, so that the diethylene glycol remained on the blade and so the diethylene glycol had a residual effect of treating the blade after each application and use of the washer composition was completed. The two blades were shown to a thirty-member panel and the blade treated with the diethylene glycol formula, Formula B was judged to be more pliable and most resembled a new blade in feel, as compared to the wiper blade treated with Formula A. Product B was also very effective for cleaning oil, grease, road film, grime, salt, bug stains, tree sap and drippings from windshields and other hard surfaces.

Though a range of diethylene glycol of 3-5% by weight affords optimum results, it was noted by experimentation that varying amounts from 0.1% to 10% could be utilized. When lesser amounts of diethylene glycol were used, on the order of 0.1%, it took longer to notice any change in blade flexibility. Since diethylene glycol evaporates more slowly than the other ingredients, it does have a cumulative beneficial effect. Use of amounts of diethylene glycol on the order of 10% does result in increased wiper blade flexibility, however, it also results in smearing of the windshield and loss of driver visibility. The range of 3-5% provides for the best cleaning operation coupled with optimum blade restoration in a relatively short time.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. A process for simultaneously cleaning windshields and for treating rubber windshield wiper blades, said process comprising the steps of providing a liquid composition containing a major proportion of a lower monohydric alcohol cleaning agent and a minor proportion of diethylene glycol, and applying said composition to said windshield while said composition also treats said blade, whereby said windshield is cleaned and said blade is conditioned, said diethylene glycol acting as said blade conditioner.

2. The process of claim 1 including adding a minor proportion of an ammonia solution to said composition, and adding a minor proportion of nonionic surface active agent to said composition.

3. The process of claim 1 wherein said diethylene glycol is included in said composition in an amount of about 3–5% by weight of said composition.

4. The process of claim 1 including the step of providing a non-ionic surface active agent and an ammonia solution in minor proportions in said composition, and providing methyl alcohol as said lower monohydric alcohol cleaning agent.

5. A process for simultaneously cleaning windshields and for conditioning rubber windshield wiper blades, said process comprising the steps of applying a liquid composition containing about 92 percent by weight of a lower monohydric alcohol cleaning agent and about 4 percent by weight of diethylene glycol to said windshield to both clean the windshield and treat the blade, said diethylene glycol acting as a blade conditioner.

6. The process of claim 5 including adding to said liquid composition a minor proportion of an ammonia solution and a minor proportion of non-ionic surface active agent, said lower monohydric alcohol cleaning agent is methyl alcohol.

References Cited

UNITED STATES PATENTS

| | | | |
|---|---|---|---|
| 3,245,912 | 4/1966 | White | 252—DIG. 10 |
| 3,152,352 | 10/1964 | Kosik, Jr. | 252—523 X |

OTHER REFERENCES

Niven—"Industrial Detergency," p. 301, 1955, scientific library.

MAYER WEINBLATT, Primary Examiner

U.S. Cl. X.R.

106—13, 311; 252—70, 139, 162, 170, DIG. 10